Figure 5:
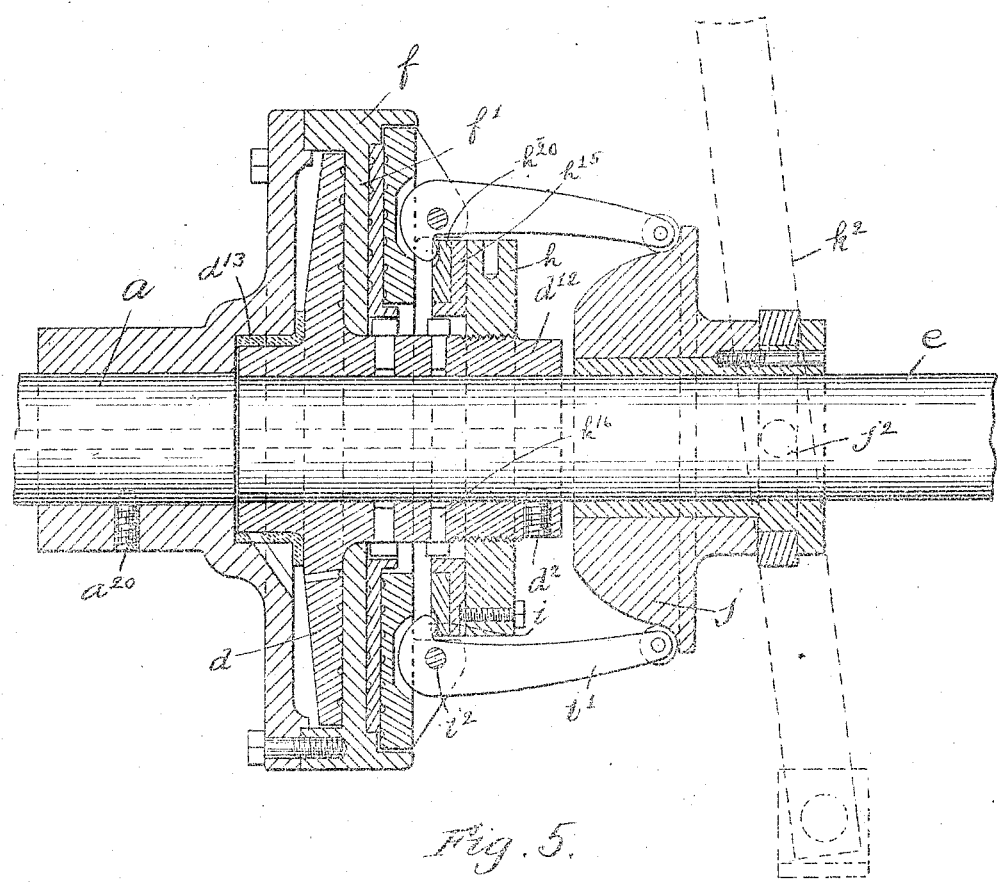

H. A. TUTTLE.
CLUTCH MECHANISM FOR REVERSE GEARING.
APPLICATION FILED JUNE 23, 1908.
901,854.
Patented Oct. 20, 1908.
2 SHEETS—SHEET 1.
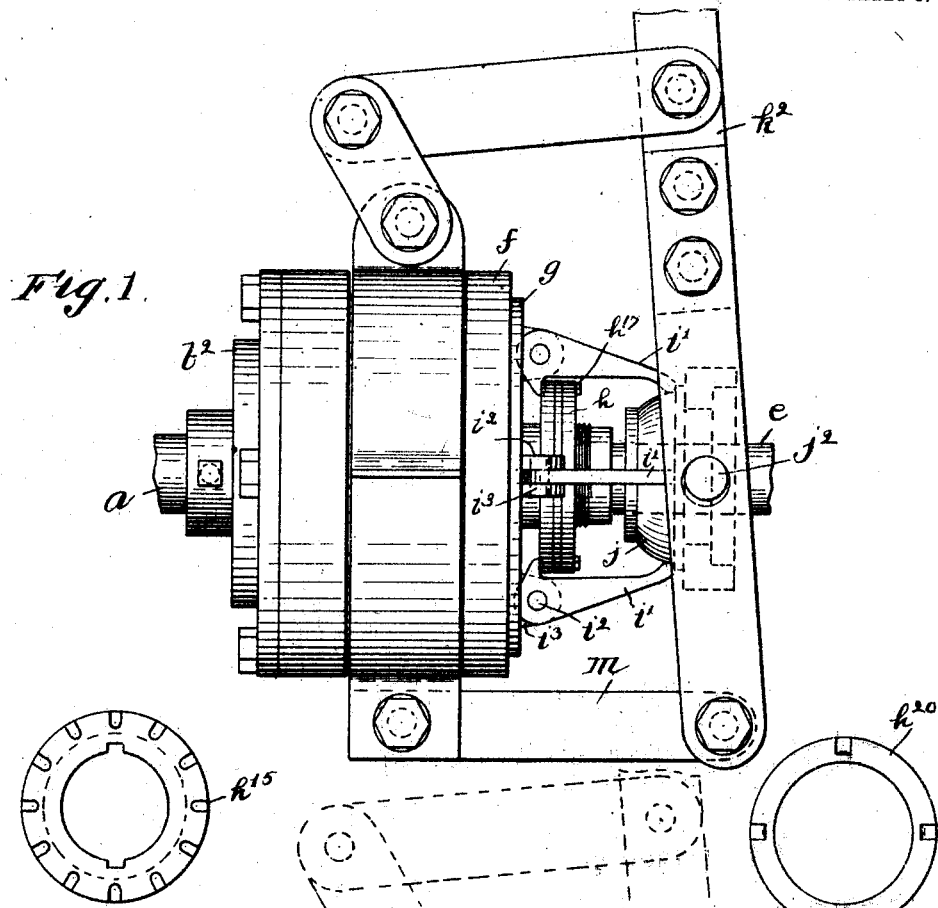
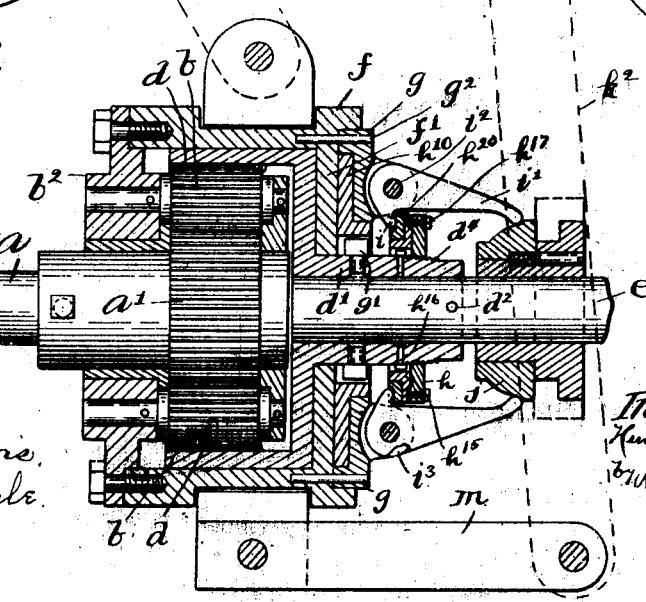
Witnesses:
H. B. Davis.
Cynthia Doyle.
Inventor:
Henry A. Tuttle
By Hayes & Harriman
Attys

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION.

CLUTCH MECHANISM FOR REVERSE-GEARING.

No. 901,854.    Specification of Letters Patent.    Patented Oct. 20, 1908.

Application filed June 23, 1908. Serial No. 439,940.

*To all whom it may concern:*

Be it known that I, HENRY A. TUTTLE, of Taunton, county of Bristol, State of Massachusetts, have invented an Improvement in Clutch Mechanism for Reverse-Gearing, of which the following is a specification.

This invention relates to clutch-mechanisms, and has for its object to construct a very powerful friction clutch-mechanism which is simple in construction and easily operated. It may be applied to reverse gearing connecting a driving-shaft with a driven-shaft, such for instance, as shown in my application for Letters Patent #390,566, filed August 29, 1907, wherein two rotatable members are employed, one having means for connecting it with a driving-shaft and the other having means for connecting it with a driven-shaft; or it may apply to a one-way transmission means having two rotatable members, one of which is connected with the driving-shaft and the other with the driven-shaft.

The invention comprises improvements in the rotatable members, whereby they serve as coöperative parts of the clutch-mechanism, also improvements in the clutch-plate and also improvements in the operating means.

Figure 1 is a side elevation of a clutch-mechanism embodying this invention, it being represented as applied to the form of reverse gearing shown in my said application. Fig. 2 is a longitudinal vertical section of the same. Figs. 3 and 4 are details to be referred to. Fig. 5 is a longitudinal vertical section of the clutch-mechanism embodying this invention applied to a simple form of transmission means.

Referring to Figs. 1 to 4 inclusive, the reverse gearing to which the clutch-mechanism is herein shown as applied, for the sake of illustration, comprises a driving-shaft $a$, spur gear $a'$ thereon, several pinions $b$ arranged about said spur gear and in engagement therewith, a plate $b^2$ supporting the bearings for said pinions, an internal gear $d$ having a hub $d'$ which is mounted upon and secured to the driven-shaft $e$ by a set-screw $d^2$, a cylindrical case $f$ which receives said internal gear having at one end a clutch-engaging wall $f'$, and having secured to its opposite end the aforesaid plate $b^2$, so that the gears are inclosed within said case.

As herein shown, the case $f$ constitutes one of the rotatable members of the clutch-mechanism and the internal gear $d$ the other rotatable member, and said members are connected, one with the driving-shaft and the other with the driven-shaft. The opposite sides of the clutch-engaging wall $f'$ of the member $f$ are both formed with flat engaging-faces and are of large area. The head or crown of the internal gear $d$ is formed exteriorly with a flat engaging-face, adapted to engage one of the engaging-faces of the wall $f'$. The peripheral wall of the internal gear is made to fit the interior of the case to thereby provide a long bearing for said gear.

Referring to Fig. 5, a case $f$ having the clutch-engaging wall $f'$, is shown, but said case is connected with the driving-shaft $a$, by a set-screw $a^{20}$ instead of by means of gearing, and in lieu of the internal gear $d$ having a flat engaging-face at the end, a disk $d$ is provided, which is secured to the driven-shaft $e$ by a set-screw $d^2$, and one side of said disk is formed with a flat engaging-face to engage one of the engaging-faces of the clutch-engaging wall $f'$ of the member $f$. Said disk is shown as having a hub $d^{12}$ within the case which is mounted on the driven-shaft $e$ to provide a long bearing for it, and one end of said hub enters a bushing $d^{13}$, arranged in a recess formed in the interior of the member $f$. Thus in both forms shown it will be observed that one of the rotable members is connected with the driving-shaft and has a clutch-engaging wall provided with two oppositely disposed engaging-faces, and that the other rotatable member is arranged adjacent the aforesaid member and is provided with an engaging-face to engage one of the engaging-faces of the aforesaid member. The two rotatable members are movable with respect to each other, such movement being permitted by a slight endwise movement of the shafts, or one only of said members may be movable with respect to the other. As engagement of said parts is frictional but a very slight movement of either or both is required.

The hub $d'$ of the member $d$ extends through a center hole in the end wall $f'$ of member $f$, and has a screw-threaded portion $d^4$ at or near its outer end which receives upon it an adjustable abutment or collar for engagement therewith of the clutch-operating fingers to be described.

A circular clutch-plate or disk $h^{10}$ is mounted on the hub $d'$, adjacent the end wall $f'$, and is held against rotation independently of the hub $d'$, and is permitted to slide longitudinally thereon by means of keys $g'$ which are secured to the hub and project radially therefrom and enter keyways formed in the hub of said clutch-plate. The clutch-plate, thus slidably engaging the hub is movable toward and from the outer engaging-face of the end wall $f'$ to thereby connect and disconnect the two rotatable members. As a means for moving said clutch-plate $h^{10}$ into engagement with the end wall $f'$, a circular actuating-plate or disk $g$ is mounted loosely on the hub of the clutch-plate which is adapted to bear against said clutch-plate. Said actuating-plate is made larger in diameter than the clutch-plate and is provided at its edge with a flange which extends over the edge of the clutch-plate, a space being thereby provided within the flange which receives the clutch-plate. The actuating-plate is slidably connected with the rotatable member $f$ by pins $g^2$, or otherwise, which are herein shown as extended through said plate near its edge and into the member $f$. These pins are fixed to the member $f$, and the actuating-plate is movable on said pins when moving the clutch-plate into and out of engagement with the end wall $f'$. The actuating-plate is thus supported and its movement guided. The movement of the clutch-plate is but slight as its engagement is frictional. Thus it will be seen that the clutch-plate is slidably connected with one of the rotatable members and that the actuating-plate is slidably connected with the other rotatable member, and that the two plates are contiguously disposed so that but a slight movement of the actuating-plate is required to move the clutch-plate into engagement with the clutch-engaging wall $f'$.

For the purpose of moving the clutch-plate $g$, an adjustable abutment is employed which consists of a collar $h$, a plate $h^{15}$ and an anti-friction ring $h^{20}$. The collar $h$ is mounted on the screw-threaded portion of the hub $d'$ Fig. 2, or the hub $d^{12}$ Fig. 5, and is adjustable thereon. The plate $h^{15}$, see Fig. 3, is arranged on the hub at one side of and contiguous said collar, and is slidably connected with the hub, it being herein shown as having its center hole provided with keyways which receive keys $h^{16}$ projecting radially from the hub. This plate is made of brass or some different metal from the collar and ring. It is prevented from rotating independently of the hub, and is employed as a means for preventing independent rotation of the collar $h$, and to accomplish this result one or more screws $h^{17}$ are extended through holes in the collar which project therefrom and enter recesses in the plate $h^{15}$. When it is desired to adjust the collar along on the hub the screws $h^{17}$ are withdrawn and the collar is then free to be turned on the hub in either direction. The plate $h^{15}$ also serves as a supporting-plate for the anti-friction ring $h^{20}$. Said ring is made as an annular disk having a center hole adapted to receive the hub of the supporting-plate $h^{15}$, and having radially disposed recesses at or near its edge, see Fig. 4, which receive the toes $i$ of the clutch-operating fingers $i'$. Said fingers are pivoted at $i^2$ to ears $i^3$, provided on the actuating-plate $g$. They extend in the general direction of the driven-shaft $e$, and engage, at their outer ends, a cone $j$ which is mounted loosely upon the shaft $e$. The cone $j$ is arranged to slide along on the shaft $e$ for the purpose of moving the fingers $i'$, and it has a collar mounted on it provided with trunnions $j^2$ projected outwardly which are engaged by the bars of the actuating-lever. As the actuating-lever is moved on its pivotal connection with the bar $m$, said sliding cone is moved in one or the other direction on the shaft $e$, and when moved in one direction the fingers will be separated, causing the toes $i$ to bear hard against the anti-friction ring, and the latter being held against rearward movement causes the pivot-supports of said fingers, to bodily move and thereby move the actuating-plate and clutch-plate toward the end wall $f'$, and as the clutch-plate engages said end wall the member $f$ will or may be moved slightly toward the member $d$. Also as the toes thus bear hard against the abutment on the member $d$, said member is moved slightly toward the member $f$, engaging the inner engaging face of the end wall $f'$ thereof. The member $f$ is thus engaged exteriorly by the clutch-plate and interiorly by the member $d$.

It will be observed that the member $f$ is engaged by the clutch-plate and by the member $d$ at approximately the same time and that engagement is effected by the same means.

When the sliding cone is moved in the opposite direction, the fingers are permitted to resume their normal positions and pressure on the actuating-plate is relieved and the clutch-plate permitted to disengage the end wall and the member $d$ also permitted to disengage said end wall.

Referring to Figs. 1 to 4, a band-brake is provided for the case, which is operated by the actuating-lever $k^2$, which is employed to operate the clutch-mechanism.

In the reverse gearing herein shown, the driven-shaft $e$ is adapted to be rotated in the same direction as the driving-shaft, and to thus rotate it the case $f$ and the internal gear $d$ are revolved in the same direction. Said driven-shaft is also adapted to remain at rest while the driving-shaft continues to rotate, and to thus hold it at rest the internal gear is held at rest and the case is revolved. Said driven-shaft is also adapted to be rotated in a direction opposite to the direction of rotation of the driving-shaft, and to thus rotate it the case is held at rest and the internal gear revolved in a direction opposite to the direction of rotation of the driving-shaft.

As the actuating-plate is connected with the case only and the fingers are pivotally connected with said actuating-plate it will be seen that said fingers will not be carried rotarily about the shaft except when the case revolves, hence when the case is at rest and the gear revolves said fingers will remain at rest. Rotary movement of the fingers about the shaft has a tendency to cause them to swing outward by centrifugal action, consequently, it is a decided advantage not to have them rotate when the gear only is revolved and the driven-shaft $e$ is thereby driven in a direction opposite to the direction of rotation of the driving-shaft. By making the supporting-plate $h^{15}$ of a different metal from the anti-friction ring $h^{20}$ and from the collar which it engages, said plate $h^{15}$ is free to revolve thereon without undue wear.

Having thus described my invention, what I claim as new and desire to secure by Letters Patent is:—

1. In a clutch-mechanism, the combination of a hollow cylindrical case having an end wall provided with two oppositely disposed clutch-engaging faces, means for connecting it with the driving-shaft, a member arranged within said case having an engaging-face for engaging one of the engaging-faces of the end wall of said case, and having a hub extending through a center hole in the clutch-engaging end wall of said case, means for connecting it with the driven-shaft, a clutch-plate slidably connected with said hub for engaging the other engaging-face of the end wall of said case, an actuating-plate disposed contiguous said clutch-plate, fingers having toes pivotally connected to said actuating-plate, a collar on the hub of said inclosed member, engaged by said toes, and a sliding cone engaged by said fingers, substantially as described.

2. In a clutch-mechanism, the combination of a hollow cylindrical case having an end wall provided with two oppositely disposed clutch-engaging faces, means for connecting it with the driving-shaft, a member arranged within said case having an engaging-face for engaging one of the engaging-faces of the end wall of said case, and having a hub extending through a center hole in the clutch-engaging end wall of said case, means for connecting it with the driven-shaft, a clutch-plate slidably connected with said hub for engaging the other engaging-face of the end wall of said case, an actuating-plate disposed contiguous said clutch-plate, means for slidably connecting it with said case, fingers having toes pivotally connected to said actuating-plate, a collar on the hub of said inclosed member, engaged by said toes, and a sliding cone engaged by said fingers, substantially as described.

3. In a clutch-mechanism, the combination with two independently rotatable members respectively connected with a driving-shaft and a driven-shaft, of a clutch-plate slidably connected with one of said members and adapted to engage the other member whereby the two members are connected together, an actuating-plate for said clutch-plate, fingers having toes pivotally connected to said actuating-plate, means for moving said fingers, a collar on the member bearing said clutch-plate having an abutting face which is engaged by said toes, which permits movement of said fingers rotarily about it, substantially as described.

4. In a clutch-mechanism, the combination with two rotatable members respectively connected with a driving-shaft and a driven-shaft, of a clutch-plate slidably connected with one of said members and adapted to engage the other member, an actuating-plate for said clutch-plate, fingers having toes pivotally connected to said actuating-plate, means for moving said fingers, an anti-friction ring engaged by said toes, and means for supporting said ring, connected with the member bearing the clutch-plate, substantially as described.

5. In a clutch-mechanism, the combination with two rotatable members respectively connected with a driving-shaft and driven-shaft, of a clutch-plate slidably connected with one of said members and adapted to engage the other member, an actuating-plate arranged contiguous said clutch-plate having a marginal flange which extends over the edge of said clutch-plate and pins projecting from the member which is adapted to be engaged by the clutch-plate which enter holes in said actuating-plate, whereby said plate is slidably connected with said member, and means for moving said actuating-plate, substantially as described.

6. In a clutch-mechanism, the combination with two rotatable members respectively connected with a driving-shaft and driven-shaft, of a clutch-plate, an actuating-plate for said clutch-plate, fingers having toes pivotally connected to said actuating-plate, a sliding cone engaged by said fingers, an adjustable collar, a supporting-plate to which it is detachably connected which is slidably connected with its support and an anti-friction plate mounted on said supporting-plate which is engaged by said toes, substantially as described.

7. In a clutch-mechanism, the combination with two rotatable members respectively connected with a driving-shaft and driven-shaft, of a clutch-plate, an actuating-plate for said clutch-plate, fingers having toes pivotally connected to said actuating-plate, a sliding cone engaged by said fingers, an anti-friction ring engaged by said toes, a supporting-plate therefor, and a collar connected with said supporting-plate, substantially as described.

8. In a clutch-mechanism, a clutch-plate, pivotally connected fingers having toes, means for moving said fingers and an abutment engaged by said toes comprising an adjustable collar, a supporting-plate, and an anti-friction ring, said collar being detachably connected with said plate by screws, substantially as described.

9. In a clutch-mechanism, a clutch-plate, pivotally connected fingers having toes, means for moving said fingers, and an abutment engaged by said toes comprising an anti-friction ring, a supporting-plate therefor, and a collar bearing said plate, substantially as described.

In testimony whereof, I have signed my name to this specification, in the presence of two subscribing witnesses.

HENRY A. TUTTLE.

Witnesses:
B. J. NOYES,
H. B. DAVIS.